(12) United States Patent
Bang et al.

(10) Patent No.: US 10,087,277 B2
(45) Date of Patent: Oct. 2, 2018

(54) POLYURETHANE FOAM AND PRODUCTION METHOD FOR THE SAME

(71) Applicant: INOAC CORPORATION, Nagoya-shi, Aichi (JP)

(72) Inventors: Sora Bang, Anjo (JP); Natsuki Ayukyo, Anjo (JP); Joann Mokyinteng, Anjo (JP)

(73) Assignee: INOAC CORPORATION, Nagoya-Shi (JP)

( * ) Notice: Subject to any disclaimer, the term of this patent is extended or adjusted under 35 U.S.C. 154(b) by 0 days.

(21) Appl. No.: 14/851,836

(22) Filed: Sep. 11, 2015

(65) Prior Publication Data

US 2015/0376324 A1    Dec. 31, 2015

Related U.S. Application Data

(63) Continuation of application No. PCT/JP2014/058979, filed on Mar. 27, 2014.

(30) Foreign Application Priority Data

Apr. 2, 2013 (JP) ................. 2013-076976
Dec. 25, 2013 (JP) ................. 2013-266862

(51) Int. Cl.
| | | |
|---|---|---|
| C08G 18/06 | (2006.01) | |
| C08J 9/30 | (2006.01) | |
| C08L 75/04 | (2006.01) | |
| C08G 18/70 | (2006.01) | |
| C08G 18/73 | (2006.01) | |
| C08G 18/78 | (2006.01) | |
| C08G 18/79 | (2006.01) | |
| C08G 18/08 | (2006.01) | |
| C08G 18/44 | (2006.01) | |
| C08G 101/00 | (2006.01) | |

(52) U.S. Cl.
CPC ......... *C08G 18/06* (2013.01); *C08G 18/0823* (2013.01); *C08G 18/0828* (2013.01); *C08G 18/44* (2013.01); *C08G 18/706* (2013.01); *C08G 18/73* (2013.01); *C08G 18/7831* (2013.01); *C08G 18/7837* (2013.01); *C08G 18/792* (2013.01); *C08J 9/30* (2013.01); *C08L 75/04* (2013.01); *C08G 2101/00* (2013.01); C08G 2101/0008 (2013.01); C08G 2101/0041 (2013.01); C08G 2101/0066 (2013.01); C08G 2350/00 (2013.01); C08J 2201/026 (2013.01); C08J 2375/04 (2013.01)

(58) Field of Classification Search
CPC ........ C08G 18/06; C08G 18/44; C08G 18/73; C08G 18/7837; C08G 18/7831; C08G 18/0823; C08G 18/0828; C08G 18/706; C08G 18/792; C08G 2101/00; C08G 2101/0008; C08G 2101/0041; C08G 2101/0066; C08G 2350/00; C08G 2375/04; C08L 75/04; C08J 9/30; C08J 2201/026

See application file for complete search history.

(56) References Cited

U.S. PATENT DOCUMENTS

| | | | |
|---|---|---|---|
| 2003/0017322 A1 | 1/2003 | Kim | |
| 2007/0249746 A1* | 10/2007 | Rische | ............... C08G 18/0828 521/172 |
| 2009/0099082 A1 | 4/2009 | Schoenberger et al. | |
| 2009/0263431 A1* | 10/2009 | Fugmann | .............. A61L 15/225 424/400 |
| 2011/0263741 A1 | 10/2011 | Tu | |
| 2013/0183491 A1 | 7/2013 | Fujisawa | |

FOREIGN PATENT DOCUMENTS

| | | |
|---|---|---|
| CN | 101412798 A | 4/2009 |
| CN | 101443373 A | 5/2009 |
| JP | 6-136084 A | 5/1994 |
| JP | 2003-042297 A | 2/2003 |
| JP | 2005-523960 A | 8/2005 |
| JP | 2008-280447 A | 11/2008 |
| JP | 2008-295932 A | 12/2008 |
| JP | 2011-501768 A | 1/2011 |
| JP | 2011-184637 A | 9/2011 |
| TW | 583372 B | 4/2004 |
| TW | 201224077 A1 | 6/2012 |
| WO | 03/091308 A1 | 11/2003 |

OTHER PUBLICATIONS

International Search Report dated Jun. 24, 2014, issued in counterpart Application No. PCT/JP2014/058979 (2 pages).
Office Action dated Oct. 6, 2015, issued in counterpart Japanese Patent Application No. 2015-510049, with Partial English translation. (7 pages).
Translation of Written Opinion dated Jun. 24, 2014 issued in counterpart application No. PCT/JP2014/058979. (11 pages).
Office Action dated Jul. 12, 2017, issued in counterpart Chinese Application No. 201480017102.2, with English translation (13 pages).

\* cited by examiner

*Primary Examiner* — John Cooney
(74) *Attorney, Agent, or Firm* — Westerman, Hattori, Daniels & Adrian, LLP (57) ABSTRACT

Polyurethane foam is formed by foaming raw materials that includes either an aliphatic isocyanate or a melamine derivative, a urethane emulsion, and an anionic foam stabilizer. The compression set (JIS K6401) of the polyurethane foam, specifically, the compression set (JIS K6401) after the polyurethane foam being allowed to stand for 22 hours in a state of 50% compression under condition of 70° C., is 40% or less. By this, it is possible to obtain polyurethane foam that is low density, pliable and resistant to collapse, i.e., polyurethane foam having high recovery properties.

18 Claims, 7 Drawing Sheets

FIG. 1

| | Embodiment 1 | Embodiment 2 | Embodiment 3 | Embodiment 4 | Embodiment 5 | Embodiment 6 | Embodiment 7 | Embodiment 8 | Embodiment 9 | Embodiment 10 |
|---|---|---|---|---|---|---|---|---|---|---|
| Urethane Emulsion 1 | 100 | 100 | 100 | 100 | 100 | 100 | 100 | 100 | 100 | 100 |
| Anionic Foam Stabilizer 1 | 1 | 3 | 6 | 12 | 15 | 30 | 6 | 6 | 3 | 1 |
| Anionic Foam Stabilizer 2 | 1 | 3 | 6 | 12 | 15 | 30 | 3 | 1 | 6 | 6 |
| Crosslinking Agent 1 | 6 | 6 | 6 | 6 | 6 | 6 | 6 | 6 | 6 | 6 |
| Appearance | ◎ | ◎ | ◎ | ◎ | ◎ | ◎ | ◎ | ◎ | ◎ | ◎ |
| Cell diameter | ◎ | ◎ | ◎ | ◎ | ◎ | ◎ | ◎ | ◎ | ◎ | ◎ |
| Compressive residual strain (70°C) | 19 | 7 | 11 | 13 | 12 | 35 | 10 | 17 | 11 | 19 |
| Compressive residual strain (room temperature) | 4 | 1 | 2 | 2 | 1 | 5 | 2 | 3 | 2 | 3 |
| Density | 495 | 320 | 210 | 100 | 77 | 54 | 205 | 285 | 221 | 152 |
| Hardness | 0.094 | 0.082 | 0.037 | 0.092 | 0.004 | 0.002 | 0.035 | 0.051 | 0.044 | 0.029 |
| Material strength | 9.1 | 8.8 | 7.53 | 6.72 | 4.21 | 2.07 | 7.71 | 8.03 | 7.07 | 6.83 |

FIG. 2

| | Embodiment 11 | Embodiment 12 | Embodiment 13 | Embodiment 14 | Embodiment 15 | Embodiment 16 |
|---|---|---|---|---|---|---|
| Urethane Emulsion 1 | 100 | 100 | 100 | 100 | — | — |
| Urethane Emulsion 2 | — | — | — | — | 100 | — |
| Urethane Emulsion 3 | — | — | — | — | — | 100 |
| Anionic Foam Stabilizer 1 | 6 | — | — | — | 6 | 6 |
| Anionic Foam Stabilizer 2 | — | 6 | — | — | 6 | 6 |
| Anionic Foam Stabilizer 3 | — | — | 6 | — | — | — |
| Anionic Foam Stabilizer 4 | — | — | — | 6 | — | — |
| Crosslinking Agent 1 | 6 | 6 | 6 | 6 | 6 | 6 |
| Appearance | × | △ | × | × | ◎ | ◎ |
| Cell diameter | △ | × | × | × | ◎ | ◎ |
| Compressive residual strain (70°C) | 35 | 35 | 34 | 38 | 27 | 5 |
| Compressive residual strain (room temperature) | 5 | 10 | 10 | 10 | 1 | 0 |
| Density | 378 | 231 | 251 | 241 | 168 | 117 |
| Hardness | 0.088 | 0.065 | 0.072 | 0.069 | 0.067 | 0.006 |
| Material strength | 9.12 | 4.26 | 4.88 | 4.52 | 8.97 | 3.26 |

FIG. 3

| | Embodiment 17 | Embodiment 18 | Embodiment 19 | Embodiment 20 | Embodiment 21 | Embodiment 22 | Embodiment 23 | Embodiment 24 |
|---|---|---|---|---|---|---|---|---|
| Urethane Emulsion 1 | 100 | — | 100 | 100 | 100 | 100 | 100 | — |
| Urethane Emulsion 3 | — | 100 | — | — | — | — | — | 100 |
| Anionic Foam Stabilizer 1 | 6 | 6 | 6 | 6 | 6 | 6 | 6 | 6 |
| Anionic Foam Stabilizer 2 | 6 | 6 | 6 | 6 | 6 | 6 | 6 | 6 |
| Crosslinking Agent 1 | 6 | 6 | — | — | — | — | — | — |
| Crosslinking Agent 2 | — | — | 6 | — | — | — | — | — |
| Crosslinking Agent 3 | — | — | — | 6 | — | — | — | — |
| Crosslinking Agent 4 | — | — | — | — | 6 | — | — | — |
| Crosslinking Agent 5 | — | — | — | — | — | 6 | — | — |
| Crosslinking Agent 6 | — | — | — | — | — | — | 6 | 6 |
| Appearance | ◎ | ◎ | ◎ | ◎ | ◎ | ◎ | ◎ | ◎ |
| Cell diameter | ◎ | ◎ | ◎ | ◎ | ◎ | ◎ | ◎ | ◎ |
| Compressive residual strain (70°C) | 11 | 5 | 17 | 20 | 14 | 12 | 36 | 5 |
| Compressive residual strain (room temperature) | 2 | 0 | 3 | 3 | 2 | 2 | 6 | 1 |
| Density | 210 | 117 | 205 | 188 | 198 | 201 | 199 | 204 |
| Hardness | 0.037 | 0.006 | 0.034 | 0.022 | 0.028 | 0.030 | 0.021 | 0.026 |
| Material strength | 7.53 | 3.26 | 7.15 | 7.23 | 6.81 | 6.91 | 5.51 | 6.01 |

FIG. 4

| | Embodiment 25 | Embodiment 26 | Embodiment 27 | Embodiment 28 | Embodiment 29 | Embodiment 30 | Embodiment 31 | Embodiment 32 |
|---|---|---|---|---|---|---|---|---|
| Urethane Emulsion 1 | 100 | 100 | 100 | 100 | 100 | 100 | 100 | 100 |
| Anionic Foam Stabilizer 1 | 6 | 6 | 6 | — | — | — | 6 | 6 |
| Anionic Foam Stabilizer 2 | — | — | — | 6 | 6 | 6 | 6 | 6 |
| Anionic Foam Stabilizer 3 | 6 | — | — | 6 | — | — | — | — |
| Anionic Foam Stabilizer 4 | — | 6 | 6 | — | 6 | 6 | — | — |
| Amphoteric Foam Stabilizer | — | — | 6 | 6 | 6 | 6 | — | — |
| Crosslinking Agent 1 | 6 | 6 | — | — | — | — | — | — |
| Crosslinking Agent 8 | — | — | — | — | — | — | 6 | — |
| Crosslinking Agent 9 | — | — | — | — | — | — | — | 6 |
| Appearance | ◎ | ◎ | ○ | ○ | △ | △ | ◎ | ◎ |
| Cell diameter | ◎ | ◎ | ◎ | × | × | × | ◎ | ◎ |
| Compressive residual strain (70°C) | 36 | 35 | 36 | 38 | 40 | 31 | 40 | 36 |
| Compressive residual strain (room temperature) | 14 | 10 | 12 | 11 | 15 | 14 | 15 | 14 |
| Density | 187 | 185 | 193 | 154 | 147 | 144 | 181 | 177 |
| Hardness | 0.025 | 0.023 | 0.037 | 0.016 | 0.018 | 0.013 | 0.033 | 0.027 |
| Material strength | 5.89 | 6.24 | 7.11 | 4.67 | 4.13 | 3.99 | 6.01 | 5.97 |

FIG. 5

|  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|
| Urethane Emulsion 1 | 100 | 100 | 100 | — | 100 | — | 100 | — | 100 | 100 |
| Urethane Emulsion 2 | — | — | — | — | — | — | — | 100 | — | — |
| Urethane Emulsion 3 | — | — | — | 100 | — | 100 | — | — | — | — |
| Anionic Foam Stabilizer 1 | — | — | 6 | 6 | 6 | 6 | 0.5 | 6 | 40 | 50 |
| Anionic Foam Stabilizer 2 | — | — | 6 | 6 | 6 | 6 | 0.5 | 6 | 40 | 50 |
| Amphoteric Foam Stabilizer | 6 | — | — | — | — | — | — | — | — | — |
| Nonionic Foam Stabilizer | — | 6 | — | — | — | — | — | — | — | — |
| Crosslinking Agent 1 | 6 | 6 | — | — | 6 | 6 | 6 | — | 6 | 6 |
| Crosslinking Agent 7 | — | — | — | — | — | — | — | — | — | — |
| Appearance | × | × | ◎ | ◎ | ◎ | ◎ | ◎ | ◎ | ◎ | ◎ |
| Cell diameter | × | × | ◎ | ◎ | ◎ | ◎ | ◎ | ◎ | ◎ | ◎ |
| Compressive residual strain (70°C) | 48 | 41 | 41 | 42 | 47 | 47 | 48 | 48 | 26 | 26 |
| Compressive residual strain (room temperature) | 18 | 25 | 15 | 16 | 14 | 16 | 28 | 21 | 11 | 11 |
| Density | 189 | 173 | 204 | 92 | 123 | 115 | 510 | 255 | 48 | 40 |
| Hardness | 0.032 | 0.030 | 0.032 | 0.005 | 0.012 | 0.010 | 0.112 | 0.067 | 0.002 | 0.001 |
| Material strength | 5.31 | 5.14 | 5.51 | 2.81 | 5.98 | 5.31 | 9.9 | 7.95 | 1.48 | 0.99 |

POLYURETHANE FOAM AND PRODUCTION METHOD FOR THE SAME

CROSS-REFERENCE TO RELATED APPLICATION

This application is a continuation of International Application No. PCT/JP2014/058979, filed on Mar. 27, 2014, now pending, herein incorporated by reference. Further, this application is based upon and claims the benefit of priority from the prior Japanese Patent Application No. 2013-076976, filed Apr. 2, 2013 and Japanese Patent Application No. 2013-266862, filed Dec. 25, 2013, the entire contents of which are incorporated herein by reference.

FIELD

The present inventions are related to polyurethane foam formed by foaming a urethane emulsion and production method thereof.

BACKGROUND

Polyurethane foam is used in products in various fields due to its considerable pliability and cushioning properties. For example, it is used as cushioning materials, packing materials, gaskets and sealing materials of communication equipment, electronic equipment or the like. Since communications equipment, electronic equipment or the like tends to be lightweight and have a flat shape, sheet-like cushioning materials and packing materials are needed. Examples of sheet-like packing materials made of polyurethane foam include those described in the following Patent Literature 1 and 2.

CITATION LIST

Patent Literature

Patent Literature 1: Japanese Laid-open Patent Publication No. 2003-42297
Patent Literature 2: Japanese Laid-open Patent Publication No. 06-136084

SUMMARY

Polyurethane foam according to the present invention includes polymer that is formed by foaming raw materials that include either an aliphatic isocyanate or a melamine derivative, a urethane emulsion and an anionic foam stabilizer (an foam stabilizer that includes compound having anionic organic group), wherein compression set (JIS K6401) of the polyurethane foam after the polyurethane foam being allowed to stand for 22 hours in a state of 50% compression under condition of 70° C. is 40% or less.

a method for producing polyurethane foam according to the present invention includes foaming raw materials that include either an aliphatic isocyanate or a melamine derivative, a urethane emulsion and an anionic foam stabilizer by means of mechanical frothing method, so that a froth of the raw materials is formed; and drying the froth by heating.

DESCRIPTION OF EMBODIMENTS

Sheet-like packing materials formed from polyurethane foam (such as gaskets for display devices of cellular telephones) have low compressive residual strain due to their fine cell structure and are superior for use as packing materials. However, when the cells are attempted to be made increasingly fine in order to reduce the thickness of the packing material, the polyurethane does not adequately foam and density becomes high. As a result, pliability of the polyurethane foam is impaired. In addition, although olefin-based foam and acrylics-based foam are able to be used as sheet-like packing materials and the like and are able to improve pliability of packing materials, olefin-based foam and acrylics-based foam generally have high compressive residual strain and collapse easily. Consequently, the use of olefin-based foam and acrylics-based foam as sheet-like packing materials and the like is not preferable. In view of the foregoing, an object of the present invention is to provide polyurethane foam that has very fine cells (such as cells having a diameter of 0.1 mm or less) suitable for a thin packing material (such as a gasket having a thickness of 0.1 mm to 0.5 mm), has pliability and has low compressive residual strain.

The polyurethane foam of the present invention is formed by foaming (or expansion-molded from) raw materials including either an aliphatic isocyanate or melamine derivative, a urethane emulsion and an anionic foam stabilizer. The use of a urethane emulsion and anionic foam stabilizer as raw materials of the polyurethane foam enables cell fineness to be increased and density of the polyurethane foam to be lowered, thereby making it possible to ensure pliability of the polyurethane foam that has fine cells suitable for a thin packing material.

Moreover, compressive residual strain becomes low by that the raw materials of the polyurethane foam include either an aliphatic isocyanate or a melamine derivative.

Compression set (JIS K6401) of the polyurethane foam of the present invention is 40% or less. As a result, polyurethane foam is able to be realized that is resistant to collapse.

Embodiments

The following provides explanation of an embodiment of the present invention. However, the present invention is not limited to the embodiment, and is able to be carried out in various aspects that have been subjected to various alterations and modifications based on the knowledge of a person with ordinary skill in the art.

The "polyurethane foam" described in the present invention is formed by foaming (or expanding) raw materials including at least one of an aliphatic isocyanate and a melamine derivative, a urethane emulsion and an anionic foam stabilizer. Although foaming is able to be carried out by various techniques, foaming by mechanical frothing method is preferable.

When producing polyurethane foam by mechanical frothing method, air or an inert gas such as nitrogen gas is forcibly blown into an Oakes mixer and the like into which the above-mentioned raw materials have been charged while stirring and mixing the above-mentioned raw materials with the Oakes mixer. A plurality of bubbles (cells) are formed by this stirring and mixing resulting in the formation of froth, or in other words, an aggregate of bubbles. After applying the stirred and mixed raw materials (froth) to the surface of a sheet that has low air permeability and adjusting the thickness of the applied raw materials by means of a roll coater, doctor knife, comma coater or slot die coater and the like to a prescribed thickness, the raw materials are dried by heating with an oven or a drying oven and the like. As a result, sheet-like polyurethane foam is formed.

In addition, the urethane emulsion, which is a raw material of the polyurethane foam, is an emulsion in which a spherical urethane resin (namely, polyurethane) having a diameter of 0.01 µm to 5 µm is dispersed in water, for example. By using the urethane emulsion and the anionic foam stabilizer as raw materials of the polyurethane foam, the cells are able to be made to be very fine and the density of the polyurethane foam is able to be lowered (namely, pliability is able to be increased).

The urethane resin of the urethane emulsion is formed from an isocyanate and a polyol. A polyol normally used as a urethane resin raw material may be used for the polyol, and examples thereof include polyester polyols, polyether polyols and polycarbonates. In addition, an isocyanate normally used as a urethane resin raw material may be used for the isocyanate, and examples thereof include aromatic isocyanates, aliphatic isocyanates and alicyclic isocyanates.

In addition, the urethane resin preferably has a hydrophilic group since it is dispersed in water. As a result, the dispersibility of the urethane resin improves. Furthermore, the urethane resin of the present invention preferably contains at least one of a sulfonic acid group, a carboxyl group and a hydroxyl group for the hydrophilic group.

In addition, the aliphatic isocyanate and melamine derivative used as raw materials of the polyurethane foam function as crosslinking agents. In particular, the aliphatic isocyanate preferably has two functional groups (such as isocyanate groups).

Figure 1:
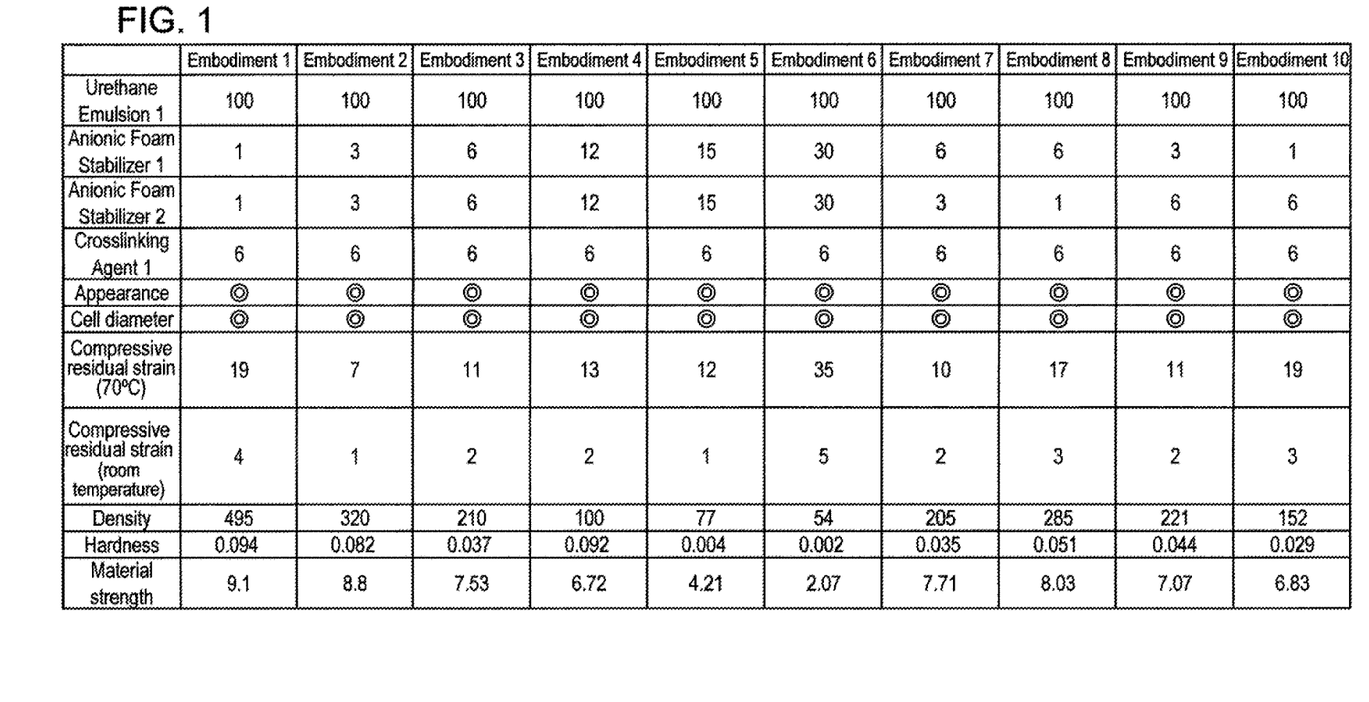
FIG. 1 is a table indicating compounded amounts (weight ratios) of raw materials for producing polyurethane foams of Examples 1 to 10 and physical properties evaluation of the polyurethane foams of Examples 1 to 10.
Figure 2:
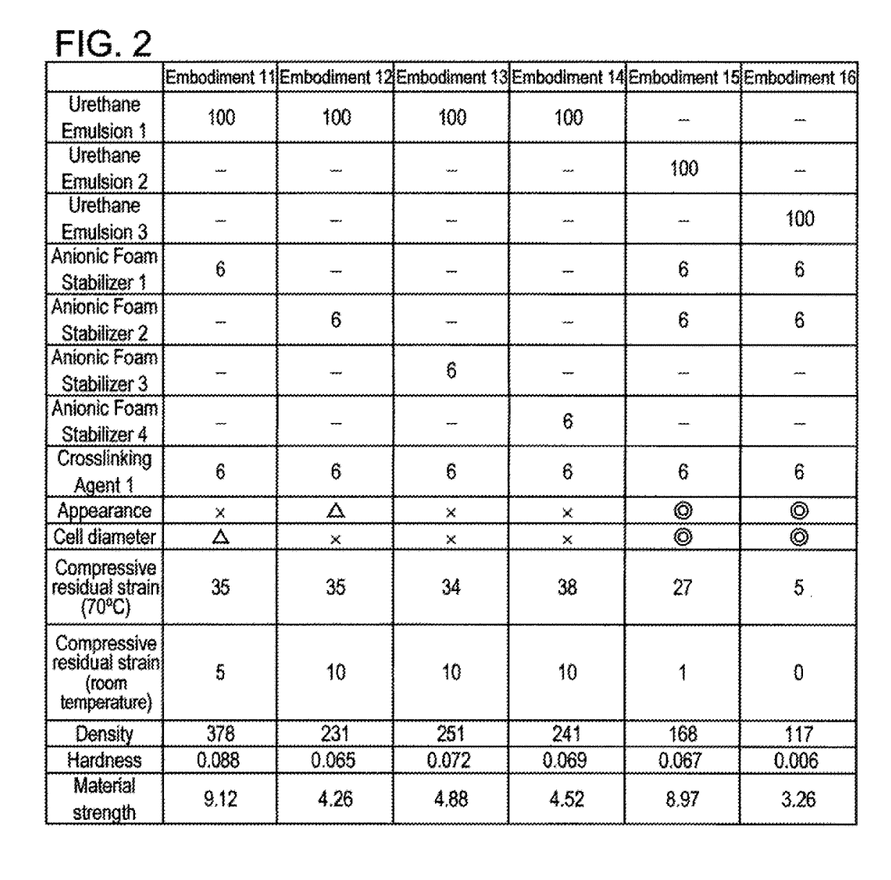
FIG. 2 is a table indicating compounded amounts (weight ratios) of raw materials for producing polyurethane foams of Examples 11 to 16 and physical properties evaluation of the polyurethane foams of Examples 11 to 16.
Figure 3:
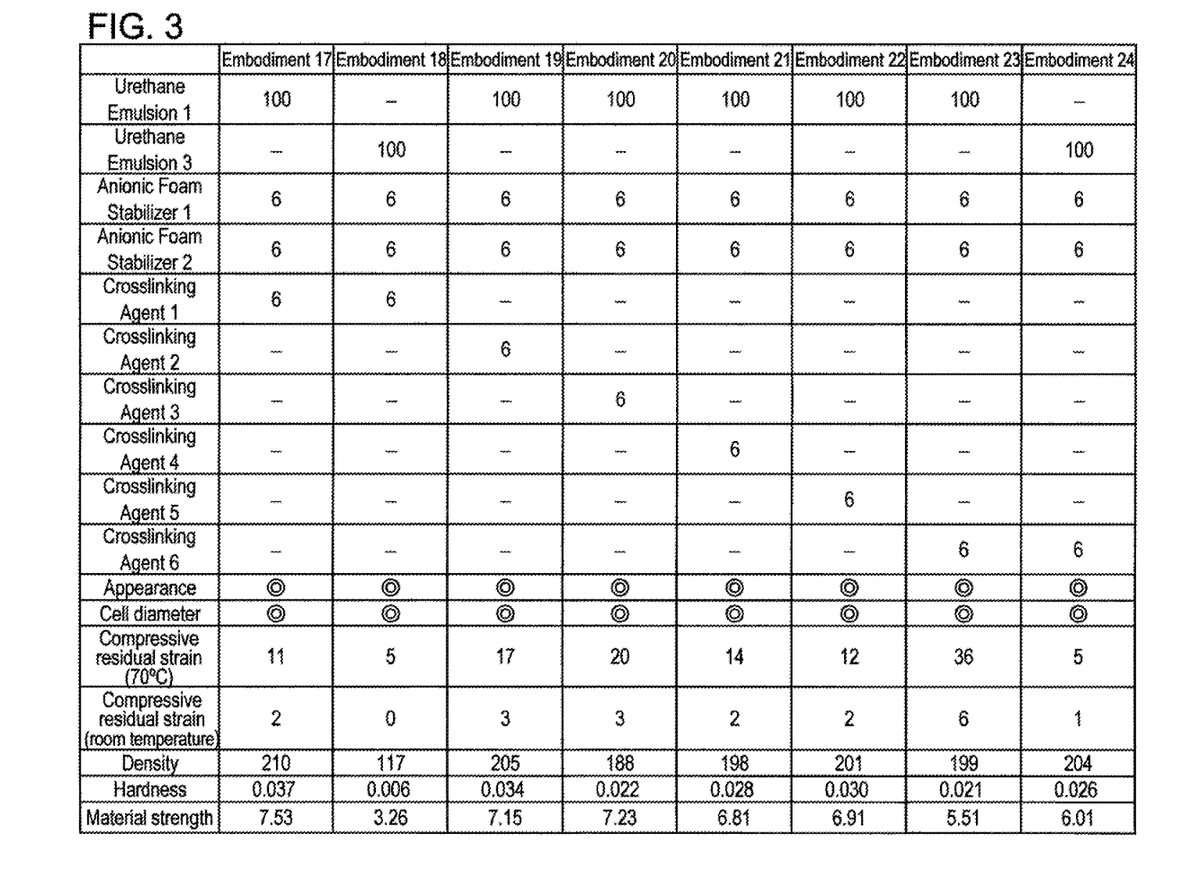
FIG. 3 is a table indicating compounded amounts (weight ratios) of raw materials for producing polyurethane foams of Examples 17 to 24 and physical properties evaluation of the polyurethane foams of Examples 17 to 24.
Figure 4:
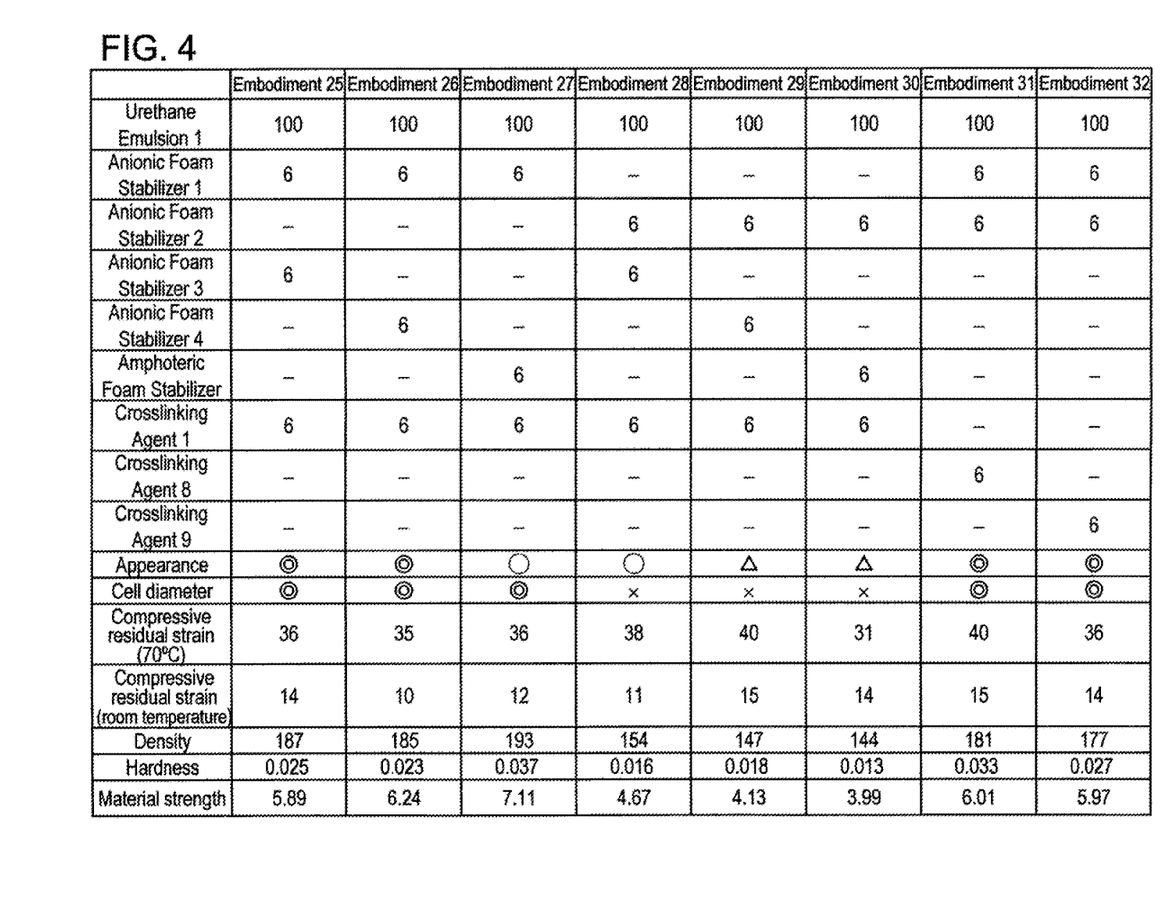
FIG. 4 is a table indicating compounded amounts (weight ratios) of raw materials for producing polyurethane foams of Examples 25 to 32 and physical properties evaluation of the polyurethane foams of Examples 25 to 32.
Figure 5:
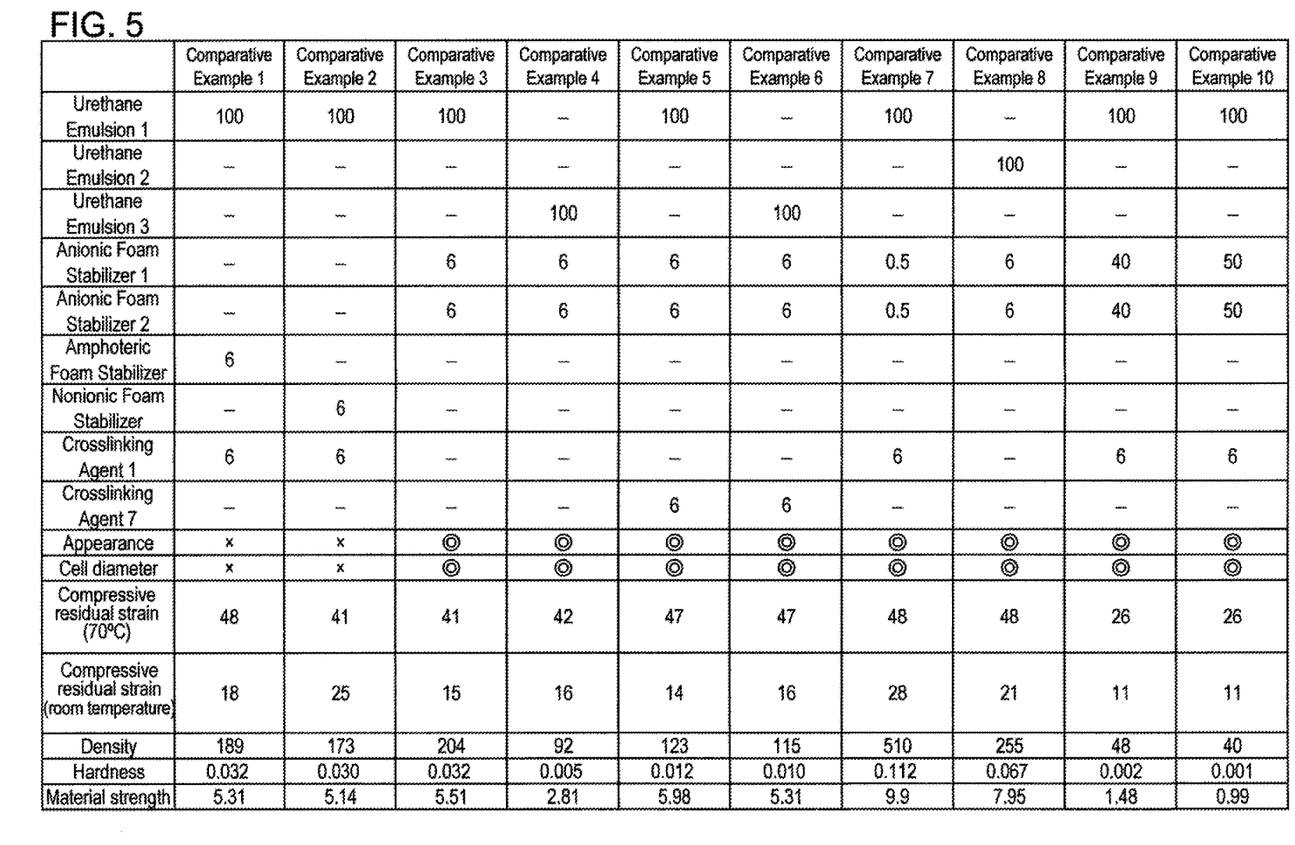
FIG. 5 is a table indicating compounded amounts (weight ratios) of raw materials for producing polyurethane foams of Comparative Examples 1 to 10 and physical properties evaluation of the polyurethane foams of Comparative Examples 1 to 10.
Figure 6:
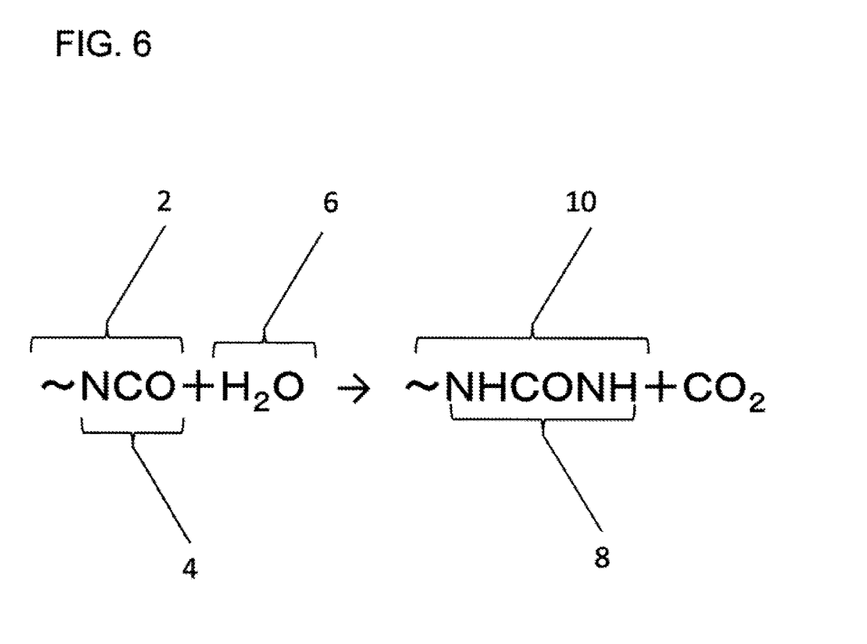
FIG. 6 is a drawing for explaining the reaction between the aliphatic isocyanate and water.
Figure 7:
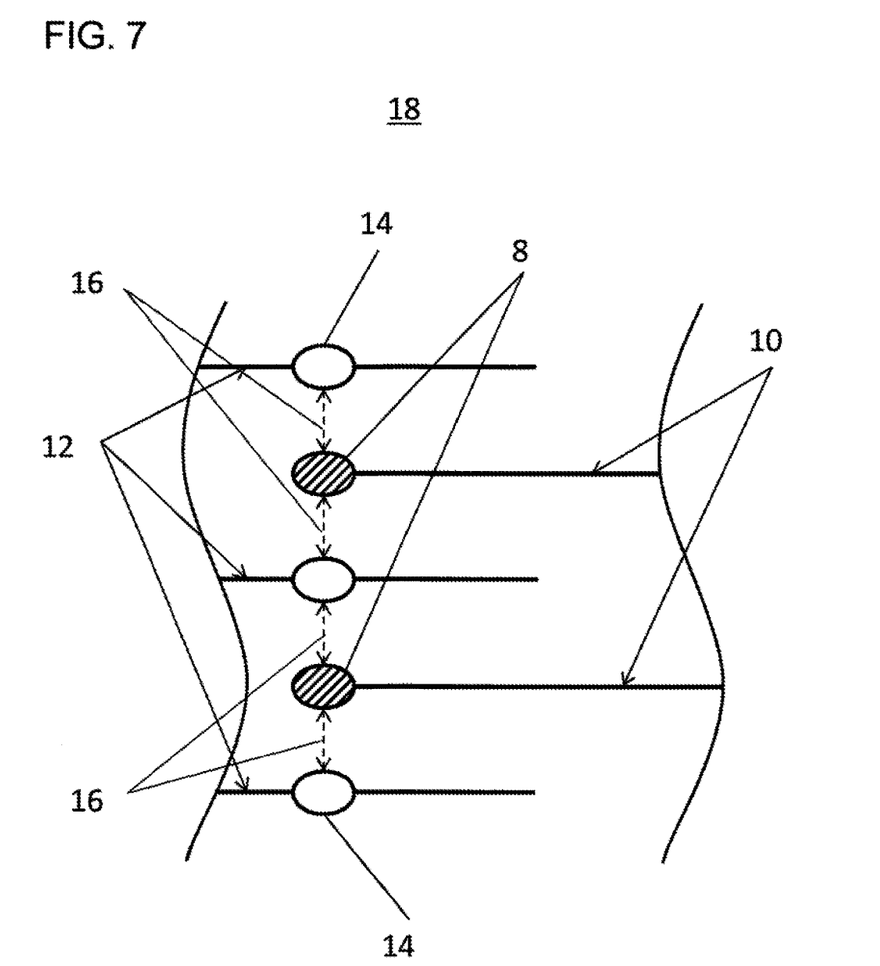
FIG. 7 is a drawing for explaining the crosslinking reaction of the present invention.

FIG. 6 is a drawing for explaining the reaction between the aliphatic isocyanate and water. FIG. 7 is a drawing for explaining an example of the crosslinking reaction of the present invention. As depicted in FIG. 6, an isocyanate group 4 of an aliphatic isocyanate 2 reacts with water 6 (such as the water of a urethane emulsion) and changes to a molecule 10 having a urea bond 8. By the way, the urea bond 8 and the urethane bond are polar bonds.

Thus, as depicted in FIG. 7, when the molecule 10 formed by the reaction of the aliphatic isocyanate 2 with the water 6 penetrates between polyurethane molecules 12 in the urethane emulsion, urethane bonds 14 and urea bonds 8 are joined by an electrical force 16. As a result, a crosslinked structure is formed in which the molecules 10 and 12 are electrically bonded.

As a result, formed is a polyurethane foam 18 that has high strength (high tensile strength) and in which compressive residual strain is low. In the case that the crosslinking agent is a melamine derivative, the N—H bonds of the melamine derivative electrically bond with the urethane bonds 14.

In another example of the present invention, the isocyanate group 4 of the aliphatic isocyanate 2 and a hydrophilic group (such as a carboxyl group or hydroxyl group) of the polyurethane molecules 12 further react, and the aliphatic isocyanate 2 and polyurethane molecules 12 are chemically bonded. A urethane emulsion 3 to be subsequently described is an example of such a urethane emulsion having a hydrophilic group.

As described above, the aliphatic isocyanate and melamine derivative may be apparent crosslinking agents which electrically bonds molecules, or may be crosslinking agents which electrically bond molecules and chemically bonds the molecules.

Although it is possible to use either the aliphatic isocyanate or melamine derivative as a crosslinking agent, the use of the aliphatic isocyanate as a crosslinking agent is preferable when considering the use of the polyurethane foam as a cushioning material or packing material of electronic equipment and the like.

In the case that the aliphatic isocyanate is used as a crosslinking agent, a hydrophobic group is preferably included therein. Polyurethane foam that is formed using an aliphatic isocyanate with a hydrophobic group as a raw material is resistant to hydrolysis, and the function thereof as a cushioning material or packing material and the like is enhanced.

In addition, since aliphatic isocyanates react more mildly with water in comparison with aromatic isocyanates and the like, they suitably function as crosslinking agents of a urethane emulsion. Consequently, the urethane resin is crosslinked at the appropriate time and the strength of the polyurethane foam is able to be ensured.

In addition, there are no particular limitations on the number of monomers (number of monomers with respect to monomers having two isocyanate groups) and the number of functional groups (number of isocyanate groups) of the aliphatic isocyanate, provided that they are values that allow the aliphatic isocyanate to function as a crosslinking agent in an appropriate manner. For example, the number of monomers is preferably 3 or more, and the number of functional groups is also preferably 3 or more. Examples of isocyanate trimers include isocyanurates and biurets. However, there is no need to exclude aliphatic isocyanates in which the number of monomers is 2 or less and the number of functional groups is 2 or less, and aliphatic isocyanates in which the number of monomers is 2 or less and the number of functional groups is 2 or less are also able to be used.

In addition, the anionic foam stabilizer used as a raw material of the polyurethane foam is for ensuring stable foaming. The amount of the anionic foam stabilizer is preferably 2% by weight to 60% by weight (namely, 2 parts by weight to 60 parts by weight), and particularly preferably 1% by weight to 35% by weight (namely, 1 part by weight to 35 parts by weight), provided that the amount of the urethane emulsion is 100% by weight (namely, 100 parts by weight). When this amount of anionic foam stabilizer is added, suitable foaming is ensured and a fine cell structure is able to be formed. Moreover, the strength and density of the polyurethane foam are able to be made to have suitable values by adding a suitable amount of the anionic foam stabilizer.

In the case of not using a foam stabilizer, froth is not formed even if the urethane emulsion is stirred while an inert gas is blown into them. The froth is formed even if a foam stabilizer other than the anionic foam stabilizer is used. However, when the formed froth is heated for drying, the bubbles disappear and a foam is not formed.

However, the fineness of the cells is able to be increased and the density of the polyurethane foam is able to be lowered (namely, pliability is able to be increased), by using the urethane emulsion and the anionic foam stabilizer.

Examples of anionic foam stabilizers include sodium laurate, sodium myristate, sodium stearate, ammonium stearate, sodium oleate, potassium oleate soap, castor oil potassium soap, coconut oil potassium soap, sodium lauroyl sarcosinate, sodium myristoyl sarcosinate, sodium oleyl sarcosinate, sodium cocoyl sarcosinate, coconut oil alcohol sodium sulfate, sodium polyoxyethylene lauryl ether sulfate, sodium alkylsulfosuccinate, sodium lauryl sulfoacetate, sodium dodecylbenzenesulfonate and sodium α-olefin sulfonate, and among them ammonium stearate and sodium alkylsulfosuccinate are particularly preferable. Moreover, using both of ammonium stearate and sodium alkylsulfosuccinate as anionic foam stabilizers is preferable.

The polyurethane foam formed by foaming the previously described raw materials is a material that has high recovery properties. More specifically, a sample of the polyurethane foam of a prescribed size is compressed to a thickness equal to 50% of the thickness prior to compression and allowed to stand under condition of 70° C. After allowing it to stand for 22 hours, the compressive residual strain of the sample is measured in accordance with JIS K6401. The compressive residual strain is 40% or less. As a result, polyurethane foam having high recovery properties, namely polyurethane foam that is resistant to collapse, is realized. Furthermore, compressive residual strain is preferably 30% or less and particularly preferably 20% or less. Furthermore, "JIS" is the abbreviation for Japanese Industrial Standard (to apply similarly hereinafter).

In addition, the hardness (JIS K6254) of the polyurethane foam is preferably 0.002 MPa to 0.1 MPa. More specifically, measured is the magnitude of repulsive stress obtained when a sample of the polyurethane foam having a diameter of 50 mm has been crushed to 25% of its thickness at a rate of 1 mm/min. This measured value is preferably 0.002 MPa to 0.1 MPa and particularly preferably 0.005 MPa to 0.1 MPa. This measured value is even more preferably 0.01 MPa to 0.1 MPa. Polyurethane foam having hardness within these ranges has adequate pliability.

In addition, material strength of the polyurethane foam is preferably 2 N/12 mm or more. More specifically, PET films are adhered (or stuck) to both sides of a sample of the polyurethane foam measuring 12 mm×70 mm. Furthermore, double-sided adhesive tapes are used to adhere (or stick) the PET film. After adhering the PET films to both sides of the sample, the sample is allowed to stand for 24 hours under condition of 85° C. and thereafter allowed to stand for 1 hour at room temperature (5° C. to 35° C., to apply similarly hereinafter). One end of each of the PET films adhered to both sides of the sample is then pulled in the direction perpendicular to the sample surface at a rate of 1000 mm/min and the tensile strength at that time is measured. This measured value is preferably 2 N/12 mm or more and particularly preferably 3 N/12 mm or more. This measured value is even more preferably 4 N/12 mm or more.

In addition, the density of the polyurethane foam (JIS K6401) is preferably 50 kg/m$^3$ to 500 kg/m$^3$. More specifically, the weight and volume of a sample of the polyurethane foam measuring 50 mm×50 mm are measured, and the weight is divided by the volume. This calculated value is preferably 50 kg/m$^3$ to 500 kg/m$^3$ and particularly preferably 60 kg/m$^3$ to 470 kg/m$^3$. The calculated value is even more preferably 80 kg/m$^3$ to 450 kg/m$^3$.

As has been described above, the polyurethane foam of the present invention has low density and low hardness. In other words, pliability is ensured. In addition, compressive residual strain is low and high recovery properties are ensured. Moreover, the polyurethane foam has high strength. In this manner, the polyurethane foam of the present invention has superior properties as a cushioning material or packing material and the like in terms of pliability, high recovery properties and high strength. On the basis thereof, the polyurethane foam of the present invention is preferably used as a cushioning material or packing material and the like (such as a gasket of the display device of a cellular telephone).

Examples

The following provides a more detailed explanation of the present invention by indicating examples thereof. However, the present invention is not limited to these examples, and is able to be carried out in various aspects that have been subjected to various alterations and modifications based on the knowledge of a person with ordinary skill in the art.

<Raw Materials and Production of Polyurethane Foam>

Polyurethane foams of Examples 1 to 32 and Comparative Examples 1 to 10 were produced from the compounded (or incorporated) raw materials indicated in FIGS. 1 to 5. The following indicates the details of each raw material.

Urethane Emulsion 1: Carbonate-based urethane emulsion (emulsion of urethane having a carbonate group), pH 8, hydrophilic group: sulfonate group, solid fraction: 40% by weight Urethane Emulsion 2: Carbonate-based urethane emulsion, pH 8, hydrophilic group: carboxyl group, solid fraction: 40% by weight Urethane Emulsion 3: Ether-based urethane emulsion (emulsion of urethane having ether bonds), pH 8, hydrophilic group: carboxyl group, solid fraction: 40% by weight Anionic Foam Stabilizer 1: Ammonium stearate, pH 11, solid fraction: 30% by weight Anionic Foam Stabilizer 2: Sodium dialkylsulfosuccinate, pH 9.4, solid fraction: 30% by weight Anionic Foam Stabilizer 3: Potassium oleate soap, pH 11.2, solid fraction: 30% by weight Anionic Foam Stabilizer 4: Castor oil potassium soap, pH 9.9, solid fraction: 30% by weight Amphoteric Foam Stabilizer: Lauryl betaine, pH 7.5, solid fraction: 30% by weight Nonionic Foam Stabilizer: Alkyl alkanolamide, pH 10.4, solid fraction: 30% by weight Crosslinking Agent 1 (Company A): Hydrophobic HDI isocyanurate (hydrophobic isocyanurate formed from hexamethylene diisocyanate), number of functional groups: 3.5, trimer Crosslinking Agent 2 (Company B): Hydrophobic HDI isocyanurate, number of functional groups: 3.5, trimer Crosslinking Agent 3: Hydrophobic HDI biuret (hydrophobic biuret formed from hexamethylene diisocyanate), number of functional groups: 3.5, trimer Crosslinking Agent 4 (Company A): Hydrophilic HDI isocyanurate, number of functional groups: 3.2, trimer Crosslinking Agent 5 (Company B): Hydrophilic HDI isocyanurate, number of functional groups: 3.2, trimer Crosslinking Agent 6: Melamine-formaldehyde (i.e., melamine-formaldehyde resin)

Crosslinking Agent 7: Carbodiimide

Crosslinking Agent 8: Hydrophobic HDI allophanate (i.e., hydrophobic allophanate formed from hexamethylene diisocyanate), number of functional groups: 2, dimer Crosslinking Agent 9: HDI monomer (monomer of hexamethylene diisocyanate)

The aforementioned raw materials are weighed out in the compounded amounts (weight ratios) indicated in FIGS. 1 to 5 and charged into an Oakes mixer or Mondo mixer. The raw materials are then stirred and mixed at 100 rpm to 1000 rpm. At this time, air or an inert gas such as nitrogen gas was forcibly blown in. The stirred and mixed raw materials are then applied to the surface of a sheet that has low air permeability, and after adjusting to a prescribed thickness with a doctor knife and the like, the coated raw materials are dried by heating with an oven or drying oven and the like. As a result, polyurethane foams of Examples 1 to 32 and Comparative Examples 1 to 10 are formed.

<Evaluation of Physical Properties of Polyurethane Foams>

The physical properties of the polyurethane foams of Examples 1 to 32 and Comparative Examples 1 to 10 produced in the manner described above were evaluated according to the methods indicated below.

More specifically, cell status and the surface of the polyurethane foams were evaluated visually. The polyurethane foams were evaluated as "⊚" (double circle) in the case that cells were uniform, and evaluated as "○" (single circle) in the case that cells were slightly non-uniform. In addition, the polyurethane foams were evaluated as "Δ" (triangle) in the case that cells were coarse, and evaluated as "x" (x-mark) in the case that cells were very coarse or cells were not formed, namely in the case that the polyurethane had not foamed. The results of this evaluation are indicated in the column entitled "Appearance" of FIGS. 1 to 5.

In addition, the cell diameter of the polyurethane foams was measured. The polyurethane foams were evaluated as "⊚" (double circle)" in the column entitled "Cell diameter" of FIGS. 1 to 5 in the case that cell diameter was less than 100 μm and evaluated as "x" (x-mark) in the column entitled "Cell diameter" of FIGS. 1 to 5 in the case that cell diameter was 100 μm or more.

In addition, the compressive residual strain (%) of the polyurethane foams was measured. More specifically, samples of the polyurethane foams of a predetermined size are compressed to a thickness equal to 50% of the thickness prior to compression and allowed to stand under condition of 70° C. After allowing them to stand for 22 hours, the compressive residual strain of the samples is measured in accordance with JIS K6401. The measured values are indicated in the column entitled "Compressive residual strain (70° C.)" of FIGS. 1 to 5. In addition, samples of the polyurethane foams of a prescribed size are compressed to a thickness equal to 50% of the thickness prior to compression and allowed to stand at room temperature. After allowing them to stand for 22 hours, the compressive residual strain of the samples is measured in accordance with JIS K6401. The measured values are indicated in the column entitled "Compressive residual strain (room temperature)" of FIGS. 1 to 5.

In addition, the density (kg/m$^3$) of the polyurethane foams was measured. More specifically, the weight and volume of samples of the polyurethane foams measuring 50 mm×50 mm were measured, and the weight was divided by the volume, in accordance with JIS K6401. The calculated values are indicated in the column entitled "Density" of FIGS. 1 to 5.

In addition, the hardness (MPa) of the polyurethane foams was measured. More specifically, measured was the magnitude of repulsive stress obtained when samples of the polyurethane foams having a diameter of 50 mm were crushed to 25% of their thickness at a rate of 1 mm/min, in accordance with JIS K6254. The measured values are indicated in the column entitled "Hardness" of FIGS. 1 to 5.

In addition, the material strength (N/12 mm) of the polyurethane foams was measured. More specifically, PET films were adhered (or stuck) to both sides of samples of the polyurethane foams measuring 12 mm×70 mm. Double-sided adhesive tapes were used to adhere (or stick) the PET films. After adhering the PET films to both sides of the samples, the samples were allowed to stand for 24 hours under condition of 85° C. and then allowed to stand for 1 hour at room temperature. One end of each of the PET films adhered to both sides of the samples was pulled in the direction perpendicular to the sample surface at a rate of 1000 mm/min and tensile strength at that time was measured. The measured values are indicated in the column entitled "Material strength" of FIGS. 1 to 5.

On the basis of the above results, the use of either an aliphatic isocyanate (Crosslinking Agents 1 to 5, 8 and 9) or melamine derivative (Crosslinking Agent 6) as crosslinking agents in the raw materials of the polyurethane foams is determined to enable compressive residual strain (70° C.) of the polyurethane foams to be roughly 40% or less and enable compressive residual strain (room temperature) to be about 10% or less. More specifically, in the polyurethane foams of Comparative Examples 3, 4 and 8, a crosslinking agent is not used in the raw materials. The compressive residual strain (70° C.) of the polyurethane foams is 41% to 48% while the compressive residual strain (room temperature) is 15% to 21%. In addition, in the polyurethane foams of Comparative Examples 5 and 6, carbodiimide (Crosslinking Agent 7) is used for the crosslinking agent and the compressive residual strain (70° C.) of the polyurethane foams is 47% while the compressive residual strain (room temperature) is 14% to 16%.

On the other hand, in the polyurethane foams of Examples 1 to 22 and 25 to 32, aliphatic isocyanates (Crosslinking Agents 1 to 5, 8 and 9) are used as crosslinking agents, in the polyurethane foams of Examples 23 and 24, a melamine derivative (Crosslinking Agent 6) is used as a crosslinking agent. The compressive residual strain (70° C.) of the polyurethane foams is 40% or less, and the compressive residual strain (room temperature) is about 10% or less. In this manner, the use of either an aliphatic isocyanate (Crosslinking Agents 1 to 5, 8 and 9) or a melamine derivative (Crosslinking Agent 6) as a crosslinking agent in the raw materials of polyurethane foam makes it possible to realize polyurethane foam having high recovery properties.

Furthermore, aliphatic isocyanates having a number of monomers of 3 or more and a number of functional groups of 3 or more (Crosslinking Agents 1 to 5) are used in the polyurethane foams of Examples 1 to 22 and 25 to 30, and aliphatic isocyanates having a number of monomers of 2 or less and a number of functional groups of 2 or less (Crosslinking Agents 8 and 9) are used in the polyurethane foams of Examples 31 and 32. Each of these polyurethane foams demonstrates compressive residual strain (70° C.) of 40% or less and compressive residual strain (room temperature) of about 10% or less. On the basis thereof, either an aliphatic isocyanate having a number of monomers of 3 or more and a number of functional groups of 3 or more, or an aliphatic isocyanate having a number of monomers of 2 or less and a number of functional groups of 2 or less may be used as a crosslinking agent. However, the compressive residual strain of polyurethane foam obtained using an aliphatic isocyanate having a number of monomers of 3 or more and a number of functional groups of 3 or more is slightly lower than the compressive residual strain of polyurethane foam obtained using an aliphatic isocyanate having a number of monomers of 2 or less and a number of functional groups of 2 or less. Consequently, an aliphatic isocyanate having a number of monomers of 3 or more (and preferably 3) and a number of functional groups of 3 or more (and preferably 3 to less than 4) is preferably used as a crosslinking agent. However, for example, the number of monomers may be 2 and the number of functional groups may be 2 to less than 3.

Moreover, the use of an anionic foam stabilizer as a foam stabilizer in the raw materials of the polyurethane foams is determined to enable compressive residual strain (70° C.) of the polyurethane foams to be roughly 40% or less and enable compressive residual strain (room temperature) to be about 10% or less. More specifically, an amphoteric foam stabilizer is used as a foam stabilizer in the polyurethane foam of Comparative Example 1, and a nonionic foam stabilizer is used as a foam stabilizer in the polyurethane foam of Comparative Example 2. In other words, anionic foam stabilizers are not used as foam stabilizers in the polyurethane foams of Comparative Examples 1 and 2. The compressive residual strain (70° C.) of the polyurethane foams of Comparative Examples 1 and 2 is 41% to 48% while the compressive residual strain (room temperature) is 18% to 25%.

On the other hand, anionic foam stabilizers are used as foam stabilizers in the polyurethane foams of Examples 1 to 32, the compressive residual strain (70° C.) of the polyurethane foams is about 40% or less, and the compressive residual strain (room temperature) is about 10% or less. In the polyurethane foams of Examples 1 to 26, 28, 29, 31 and 32 in particular, only an anionic foam stabilizer is used for the foam stabilizer, the compressive residual strain (70° C.) of the polyurethane foams do not exceed 40%, and the compressive residual strain (room temperature) do not exceed 15%. In this manner, the use of an anionic foam stabilizer for the foam stabilizer in the raw materials of polyurethane foam, and particularly the use of only an anionic foam stabilizer, makes it possible to realize polyurethane foam having high recovery properties.

Moreover, ammonium stearate (Anionic Foam Stabilizer 1) and sodium dialkylsulfosuccinate (Anionic Foam Stabilizer 2), which are two types of foam stabilizers, are used as foam stabilizers in the polyurethane foams of Examples 1 to 10 and 15 to 24, the compressive residual strain (70° C.) of the polyurethane foams is 36% or less and the compressive residual strain (room temperature) is 6% or less. In addition, the appearance of the polyurethane foams of Examples 1 to 10, 15 to 24, 31 and 32 is evaluated as "○" (single circle) and "⊚" (double circle), and cell diameter is evaluated as "⊚" (double circle). On the basis thereof, the use of both ammonium stearate (Anionic Foam Stabilizer 1) and sodium dialkylsulfosuccinate (Anionic Foam Stabilizer 2) (two types of foam stabilizers) as foam stabilizers in the raw materials of polyurethane foam is preferable.

However, it is needed to properly adjust the compounded amount of foam stabilizer even in the case of using both ammonium stearate (Anionic Foam Stabilizer 1) and sodium dialkylsulfosuccinate (Anionic Foam Stabilizer 2) (two types of foam stabilizers) as foam stabilizers. More specifically, in the polyurethane foam of Comparative Example 7, the total amount of two types of foam stabilizers including ammonium stearate (Anionic Foam Stabilizer 1) and sodium dialkylsulfosuccinate (Anionic Foam Stabilizer 2) is 1% by weight when the amount of the urethane emulsion is 100% by weight. The compressive residual strain (70° C.) of this polyurethane foam of Comparative Example 7 is 48%, and the compressive residual strain (room temperature) is 28%. Moreover, density ($kg/m^3$) and hardness (MPa) are also comparatively high. In addition, in the polyurethane foams of Comparative Examples 9 and 10, the total amount of the two types of foam stabilizers including ammonium stearate (Anionic Foam Stabilizer 1) and sodium dialkylsulfosuccinate (Anionic Foam Stabilizer 2) are 80% by weight or more when the amount of the urethane emulsion is 100% by weight. The density ($kg/m^3$) and hardness (MPa) of these polyurethane foams of Comparative Examples 9 and 10 are a little low. Moreover, material strength (N/12 mm) is at 1.5 N/12 mm or less and very low.

Furthermore, there are also cationic foam stabilizers for use as foam stabilizers. However, cationic foam stabilizers are not preferable since the urethane emulsion is anionic. If a cationic foam stabilizer is added to the urethane emulsion, polyurethane particles are attracted to each other through the cationic foam stabilizer and end up aggregating.

On the other hand, in the polyurethane foams of Examples 1 to 10, the total amount of two types of foam stabilizers including ammonium stearate (Anionic Foam Stabilizer 1) and sodium dialkylsulfosuccinate (Anionic Foam Stabilizer 2) is 2% by weight to 60% by weight when the amount of the urethane emulsion is 100% by weight. The compressive residual strain (70° C.) of these polyurethane foams of Examples 1 to 10 is 35% or less and the compressive residual strain (room temperature) is 5% or less. In addition, density ($kg/m^3$) is 54 $kg/m^3$ to 495 $kg/m^3$, and hardness (MPa) is 0.002 MPa to 0.094 MPa. In other words, these polyurethane foams have suitable pliability. Moreover, material strength (N/12 mm) is 2 N/12 mm or more, and therefore these polyurethane foams have suitable strength. On the basis thereof, the total amount of the two types of foam stabilizers of ammonium stearate (Anionic Foam Stabilizer 1) and sodium dialkylsulfosuccinate (Anionic Foam Stabilizer 2) is preferably 2% by weight to 60% by weight when the amount of the urethane emulsion is 100% by weight. Moreover, in the polyurethane foams of Examples 1 to 5 and 7 to 10, the amount of two types of foam stabilizers including ammonium stearate (Anionic Foam Stabilizer 1) and sodium dialkylsulfosuccinate (Anionic Foam Stabilizer 2) is 2% by weight to 30% by weight when the amount of the urethane emulsion is 100% by weight. The compressive residual strain (70° C.) of the polyurethane foams of Examples 1 to 5 and 7 to 10 is 19% or less, and the compressive residual strain (room temperature) is 4% or less. Moreover, material strength (N/12 mm) is 4 N/12 mm or more, and therefore these polyurethane foams are very tough. On the basis thereof, the total amount of the two types of foam stabilizers of ammonium stearate (Anionic Foam Stabilizer 1) and sodium dialkylsulfosuccinate (Anionic Foam Stabilizer 2) is particularly preferably 2% by weight to 30% by weight when the amount of the urethane emulsion is 100% by weight.

The following lists various aspects of the present invention.

(1) Polyurethane foam that is formed by foaming raw materials including either an aliphatic isocyanate or a melamine derivative, a urethane emulsion and an anionic foam stabilizer, wherein compression set thereof after the polyurethane foam being allowed to stand for 22 hours in a state of 50% compression under condition of 70° C. (JIS K6401) is 40% or less.

(2) The polyurethane foam described in (1) above, wherein the amount of the anionic foam stabilizer is 2% by weight to 60% by weight in the case the amount of the urethane emulsion is 100% by weight.

(3) The polyurethane foam described in (1) or (2) above, wherein the polyurethane foam is formed by foaming by means of mechanical frothing method.

(4) The polyurethane foam described in any of (1) to (3) above, wherein the aliphatic isocyanate has 3 or more monomers and 3 or more functional groups.

(5) The polyurethane foam described in any of (1) to (3) above, wherein the aliphatic isocyanate has 2 or fewer monomers and 2 or fewer functional groups.

(6) The polyurethane foam described in any of (1) to (5) above, wherein a urethane resin of the urethane emulsion includes a hydrophilic group.

(7) The polyurethane foam described in (6) above, wherein the hydrophilic group of the urethane resin is at least one of a sulfonate group, a carboxyl group and a hydroxyl group.

(8) The polyurethane foam described in any of (1) to (7) above, wherein the aliphatic isocyanate includes a hydrophobic group.

(9) The polyurethane foam described in any of (1) to (8) above, wherein the anionic foam stabilizer includes at least one of ammonium stearate and sodium alkylsulfosuccinate.

(10) The polyurethane foam described in any of (1) to (9) above, wherein the anionic foam stabilizer includes both ammonium stearate and sodium alkylsulfosuccinate.

(11) The polyurethane foam described in any of (1) to (10) above, wherein hardness (JIS K6254) thereof is 0.002 MPa to 0.1 MPa.

(12) The polyurethane foam described in any of (1) to (11) above, wherein density (JIS K6401) thereof is 50 kg/m$^3$ to 500 kg/m$^3$.

(13) The polyurethane foam described in any of (1) to (12) above, wherein, in case of defining material strength thereof as tensile strength (N/12 mm) measured when PET films are pulled at a rate of 1000 mm/min after when the PET films adhered to both sides of the polyurethane foam with double-sided adhesive tapes are allowed to stand for 24 hours under condition of 85° C. followed by allowing the PET films to stand for 1 hour at room temperature, the material strength thereof is 2 N/12 mm or more.

What is claimed is:

1. Polyurethane foam comprising
polymer that is formed by foaming raw materials that include an aliphatic isocyanate having a hydrophobic group, a urethane emulsion and an anionic foam stabilizer, the urethane emulsion including polyurethane resin having a hydrophilic group and a diameter of 0.01 μm to 5 μm,
wherein compression set (JIS K6401) of the polyurethane foam after the polyurethane foam being allowed to stand for 22 hours in a state of 50% compression under condition of 70° C. is 40% or less;
wherein the anionic foam stabilizer includes both ammonium stearate and sodium alkylsulfosuccinate;
wherein urethane bonds of the urethane emulsion and urea bonds are joined by an electrical force to form a crosslinked structure, the urea bonds formed by reaction between the aliphatic isocyanate and water of the urethane emulsion.

2. The polyurethane foam according to claim 1, wherein an amount of the anionic foam stabilizer is 2 parts by weight to 60 parts by weight in case that an amount of the urethane emulsion is 100 parts by weight.

3. The polyurethane foam according to claim 1, wherein the polyurethane foam is formed by foaming by means of mechanical frothing method.

4. The polyurethane foam according to claim 1, wherein the aliphatic isocyanate has 3 or more monomers and 3 or more functional groups.

5. The polyurethane foam according to claim 1, wherein the aliphatic isocyanate has 2 or fewer monomers and 2 or fewer functional groups.

6. The polyurethane foam according to claim 1, wherein a urethane resin of the urethane emulsion includes a hydrophilic group.

7. The polyurethane foam according to claim 6, wherein the hydrophilic group of the urethane resin is at least one of a sulfonate group, a carboxyl group and a hydroxyl group.

8. The polyurethane foam according to claim 1, wherein hardness (JIS K6254) thereof is 0.002 MPa to 0.1 MPa.

9. The polyurethane foam according to claim 1, wherein density thereof (JIS K6401) is 50 kg/m$^3$ to 500 kg/m$^3$.

10. The polyurethane foam according to claim 1, wherein material strength thereof is 2 N/12 mm or more,
wherein the material strength is defined as tensile strength (N/12 mm) measured when PET films are pulled at a rate of 1000 mm/min after when the PET films adhered to both sides of the polyurethane foam with double-sided adhesive tapes are allowed to stand for 24 hours under condition of 85° C. followed by allowing the PET films to stand for 1 hour at room temperature.

11. A method for producing polyurethane foam, comprising:
foaming raw materials that include an aliphatic isocyanate having a hydrophobic group, a urethane emulsion and an anionic foam stabilizer, the urethane emulsion including polyurethane resin having a hydrophilic group and a diameter of 0.01 μm to 5 μm, by means of mechanical frothing method, so that a froth of the raw materials is formed; and
drying the froth by heating;
wherein the anionic foam stabilizer includes both ammonium stearate and sodium alkylsulfosuccinate;
wherein urethane bonds of the urethane emulsion and urea bonds are joined by an electrical force to form a crosslinked structure, the urea bonds formed by reaction between the aliphatic isocyanate and water of the urethane emulsion.

12. The method for producing polyurethane foam according to claim 11, wherein an amount of the anionic foam stabilizer is 2 parts by weight to 60 parts by weight in case that an amount of the urethane emulsion is 100 parts by weight.

13. The method for producing polyurethane foam according to claim 11, wherein the aliphatic isocyanate has 3 or more monomers and 3 or more functional groups.

14. The method for producing polyurethane foam according to claim 11, wherein the aliphatic isocyanate has 2 or fewer monomers and 2 or fewer functional groups.

15. The method for producing polyurethane foam according to claim 11, wherein a urethane resin of the urethane emulsion includes a hydrophilic group.

16. The method for producing polyurethane foam according to claim 15, wherein the hydrophilic group of the urethane resin is at least one of a sulfonate group, a carboxyl group and a hydroxyl group.

17. A method for producing polyurethane foam, comprising:
   foaming raw materials that include a melamine derivative, a urethane emulsion and an anionic foam stabilizer by means of mechanical frothing method so that a froth of the raw materials is formed, the urethane emulsion including polyurethane resin having a hydrophilic group and a diameter of 0.01 µm to 5 µm; and
   drying the froth by heating,
   wherein urethane bonds of the urethane emulsion and N—H bonds of the melamine derivative are joined by an electrical force to form a crosslinked structure.

18. The polyurethane foam according to claim 1, wherein the hydrophilic group is a sulfonic acid group or a carboxyl group.

* * * * *